May 24, 1966  H. J. RICHARDS  3,252,532

WEIGH SCALE PLATFORM STABILIZING APPARATUS

Filed March 26, 1965

INVENTOR.
HOWARD J. RICHARDS
BY Flehr & Swain
ATTORNEYS

United States Patent Office 3,252,532
Patented May 24, 1966

3,252,532
WEIGH SCALE PLATFORM STABILIZING
APPARATUS
Howard J. Richards, Portland, Oreg., assignor to Freightliner Corporation, Portland, Oreg., a corporation of Delaware
Filed Mar. 26, 1965, Ser. No. 443,056
9 Claims. (Cl. 177—255)

This invention relates to means for weighing trucks and the like and more particularly, to stabilizing apparatus for the scale platform.

Weighing apparatus of the above type usually comprises a plurality of load cells mounted to support a platform upon which a wheel of a truck may be driven. The weight of the truck exerts a vertical force on the platform. This force is transmitted to the load cells which include means for developing a signal representative of the force. Such load cells are generally calibrated for vertical loads and give erroneous signals when subjected to lateral forces which can arise if the weighing platform is moved laterally or rotated. The rolling, starting, stopping and turning motions of truck wheels driven on a weigh platform tend to produce large lateral and rotational forces on the weigh platform which are difficult to control.

Heretofore, several methods have been used to prevent such non-vertical forces from being applied to the load cells. These have consisted of tie bars pivotally fastened between the weigh platform and the base, cantilevered beams fastened between the weigh platform and the base, or in the case of very large scales, between a pit wall and the weigh platform. Various electrical arrangements for canceling out errors due to lateral forces have also been utilized. None of these systems have proven to be an entirely satisfactory solution to the problem, especially when load cell deflections become appreciable.

It is therefore a general object of the invention to provide a weigh scale platform stabilizing apparatus which will overcome the above named difficulties.

It is another object of the invention to provide an improved stabilizing apparatus for use in weigh scale devices and the like.

Another object of the invention is to provide a device of the above character wherein the weigh platform is maintained in vertical alignment under service conditions of the apparatus without requiring the use of pivoted linkages, rolling support means or cantilevered beams as heretofore used thereby to reduce the cost and complication of design for the apparatus without sacrificing accuracy, sensitivity or reliability of the entire mechanism or the load cells therein.

Another object of the invention is to provide an apparatus of the above character in which it is rendered unnecessary to provide complicated electrical circuitry to prevent unreliable load cell readings caused by lateral and rotational platform motions.

Another object of the invention is to provide an apparatus of the above character which utilizes shear tubes to prevent lateral and rotational forces applied to the platform from being transmitted to the load cells.

Another object of the invention is to provide apparatus of the above character in which the structure is low cost, simple and lightweight.

Additional objects and features of the invention will appear from the following description in which a preferred embodiment is set forth in detail and in conjunction with the accompanying drawings of which:

Figure 1:
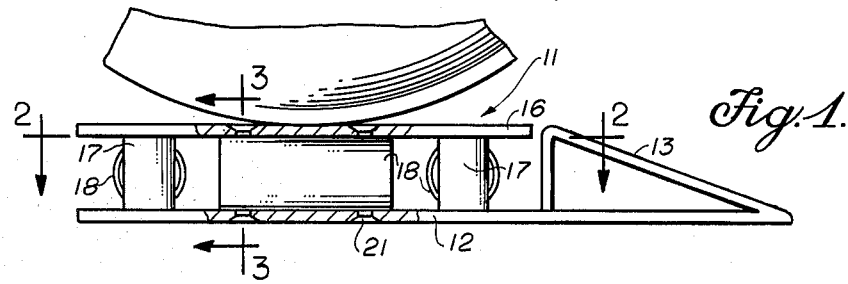
FIGURE 1 is a side elevational view of a weigh scale platform stabilizing apparatus constructed according to my invention.
Figure 2:
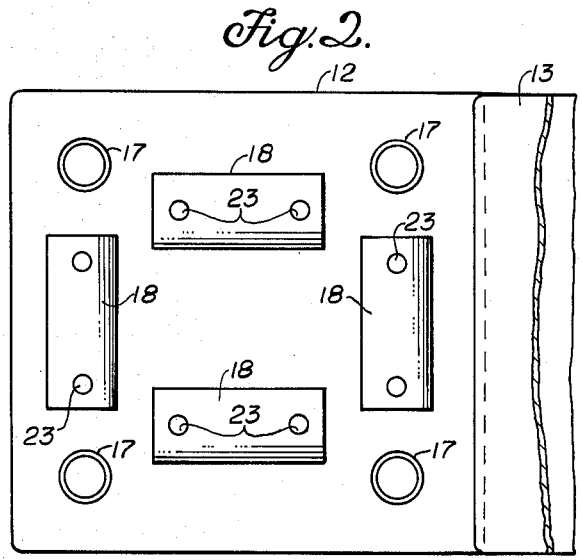
FIGURE 2 is a top plan view of the stabilizing apparatus shown in FIGURE 1 taken along the line 2—2.
Figure 3:
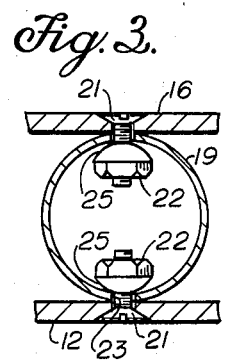
FIGURE 3 is a cross-sectional view of a particular unit of the stabilizing support means of the scale apparatus as shown in FIGURE 1 and taken along the lines 3—3.

Referring now to FIGURES 1–3, there is shown a weigh scale 11 having a base 12 to which is attached an incline ramp 13 to facilitate driving the vehicle onto the scale. The weigh scale 11 comprises essentially a platform 16 supported by load cells 17. Suitable load cells 17 are well known in the art and may be constructed to operate with pneumatic, hydraulic or electrical transducers.

Means are provided for stabilizing the platform 16 against lateral and rotational forces while leaving the platform relatively free to move against the load cells in a vertical direction. Such means consist of a plurality of shear tubes 18 disposed horizontally between the base 12 and the platform 16. The shear tubes 18 are provided with an outside diametrical dimension approximately the same as the height of the load cells 17 and large enough to permit attachment of opposite sidewalls of the shear tubes to the base and platform respectively. The shear tubes 18 are disposed between the base 12 and the platform 16 in a generally horizontal manner so that the outer sidewalls 19 of the tubes 18 contact on one side the base 12 and on the diametrically opposite side the platform 16.

Means are provided for independently attaching each of the opposite portions of the sidewalls 19 of each of the tubes 18 to the platform 16 and base 12. Such means may consist of bolts 21 which are fastened to nuts 22 through the pairs of holes 23 and 24 on each of the opposite sides of the walls of the tubes 18. Beneath the nuts 22 are provided semi-cylindrical washers 25 having a radius less than the inner relaxed curvature of the tubes 18 and mounted with their curved sides in contact with the tube. The washers 25 prevent abrupt unloading of the clamping force of the nut 22 on the inner face of the tube as the local curvature in this region changes under load and thus prevents undesired preload effects due to this cause.

The tubes 18 may be constructed from any suitable tubing which will have the property of being stiff against longitudinal shear but relatively flexible in other modes of flexion. Tubing of circular cross-section is preferred, however, tubing of other cross-sections, such as elliptical or hexagonal, may be used. The tubes should have a relatively low transverse spring constant i.e. be relatively flexible with respect to transverse loads so that in the main, the load cells will bear the weight of vertical forces transmitted by the platform 16. The arrangement of the tubes as hereinafter discussed will provide lateral and rotational restraint. Conventional thin wall tubing having an outside diameter about the same as the height of the load cells and having a length about three or more times its diameter has been found satisfactory. By thin wall tubing is meant tubing wherein the wall thickness is less than about 1/10 of the inside diameter of the tubing.

In the embodiment shown in FIGURES 1–3, two inch diameter shear tubes 18 of about 6″ in length and of about 18 to 20 gauge thickness constructed of mild steel were used. However, it will be appreciated that the wall thickness and length of the tubing are so related to flexibility, number of tubes used, deflection and strength of the particular material chosen, that exact dimensions for all applications and materials is not possible. Greater radial support will be given by a longer tube, but any excess length over that necessary to achieve lateral and rotational stability increases the vertical spring constant of the system.

The preferred configuration of shear tubes is shown in FIGURES 1-3. It comprises four tubes arranged in perpendicularly spaced parallel pairs to define a generally rectangular pattern. The rectangular pattern has the characteristic that the tubes will prevent lateral and rotational movement of the platform with respect to the base for any lateral or rotational forces applied in the plane of the weigh platform.

Figure 4:
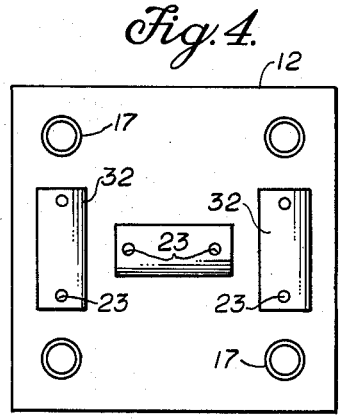
FIGURES 4 and 5 are top plan views of alternate arrangements of stabilizing structure constructed according to my invention.
Figure 5:
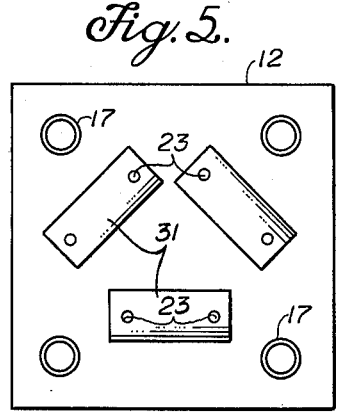

While I have shown a preferred arrangement utilizing four shear tubes arranged in a rectangle, there are other arrangements which can provide lateral and rotational restraint in a plane generally parallel to the plane of the platform. As shown in FIGURES 5 and 4, shear tubes 31 and 32 are arranged in a "Δ" pattern and "H" respectively to provide such a construction.

Thus, there is provided a simple and efficient apparatus for stabilizing a weighing platform against lateral and rotational forces directed generally parallel to the platform while permitting the transmission of vertical forces to the load sensors.

I claim:
1. In a weigh scale stabilizing apparatus, the combination comprising a weigh scale platform supported in spaced relation to a base by load cells and a plurality of shear tubes having a diametral dimension substantially the same as the height of the load cells, said shear tubes affixed at opposite sidewalls of the tubes to the platform and base respectively, said tubes being formed to strongly resist longitudinal shear while being relatively flexible in a direction generally perpendicular to their axes, and arranged in a configuration under the platform to transmit vertical forces applied to said platform to the load cells while resisting lateral forces.

2. In a weigh scale stabilizing apparatus, the combination comprising a weigh scale platform supported in spaced relation to a base by load cells and a plurality of shear tubes having a diametral dimension substantially the same as the height of the load cells, said shear tubes affixed at opposite sidewalls of the tubes to the platform and base respectively, said tubes being formed to strongly resist longitudinal shear while being relatively flexible in a direction generally perpendicular to their axes, said tubes arranged in a configuration which will cause lateral forces on the platform to be resisted by the resistance of at least one of the tubes to longitudinal shear and further, which will also cause rotational forces applied to the platform to be resisted by longitudinal shear whereby vertical forces applied to said platform will be transferred to the load cells while lateral and rotational forces applied to the platform will be resisted by the shear resistance of at least one of the tubes.

3. A weigh scale stabilizing apparatus as in claim 2 in which at least four shear tubes are utilized and are arranged in the shape of a rectangle.

4. A weigh scale stabilizing apparatus as in claim 2 in which three tubes are utilized and arranged in the shape of a delta.

5. A weigh scale stabilizing apparatus as in claim 2 in which at least three tubes are utilized and are arranged in the shape of an H.

6. A weigh scale stabilizing apparatus as in claim 2 in which the tubes are thin walled.

7. A weigh scale stabilizing apparatus as in claim 2 in which the length of the tube is greater than the average diametral dimension thereof.

8. A weigh scale stabilizing apparatus as in claim 2 in which the length of each tube is about three times the average diametral dimension thereof.

9. A weigh scale stabilizing apparatus as in claim 2 in which each shear tube is constructed with a circular cross-section having an outside diameter about the height of the load cells.

References Cited by the Examiner
UNITED STATES PATENTS
2,269,969   1/1942   Branick _____ 177—161 X FOREIGN PATENTS
440,258   2/1927   Germany.
342,484   2/1931   Great Britain.

LEO SMILOW, *Primary Examiner.*